J. F. TAYLOR.
Steam and Hydraulic Press.

No. 199,237.   Patented Jan. 15, 1878.

UNITED STATES PATENT OFFICE.

JOHN F. TAYLOR, OF CHARLESTON, SOUTH CAROLINA.

IMPROVEMENT IN STEAM AND HYDRAULIC PRESSES.

Specification forming part of Letters Patent No. 199,237, dated January 15, 1878; application filed September 29, 1877.

*To all whom it may concern:*

Figure 1:
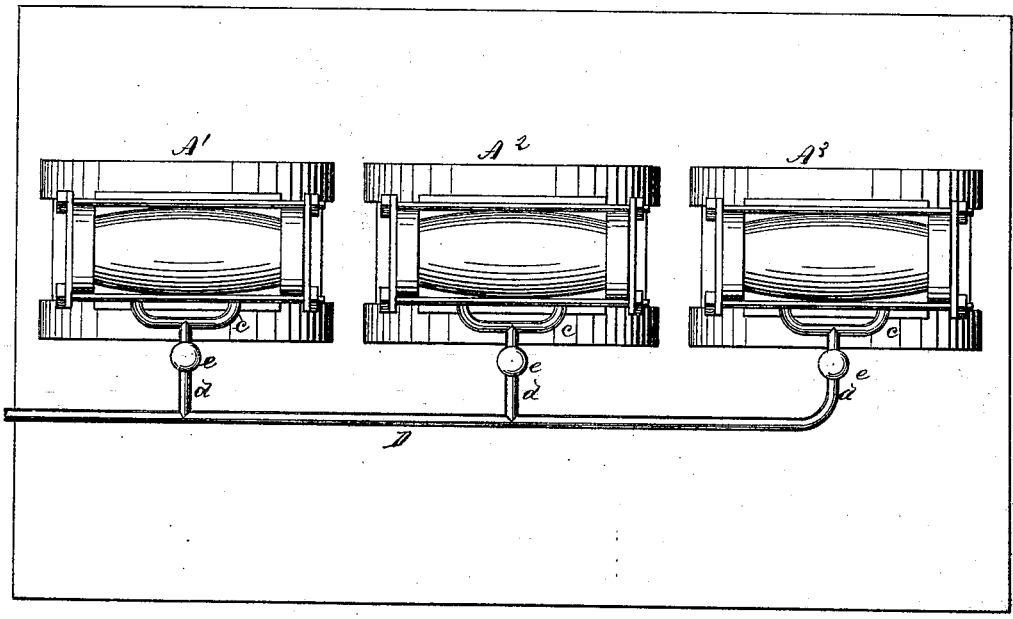
Figure 2:
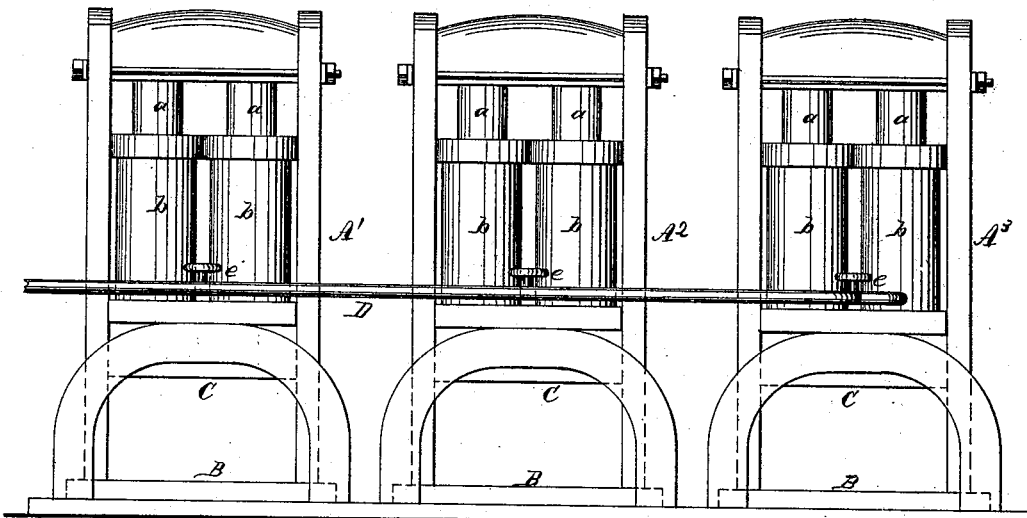

Be it known that I, JOHN F. TAYLOR, of the city and county of Charleston, and State of South Carolina, have invented a new and useful Improvement in Steam and Hydraulic Presses, of which the following is a specification:

Figure 1 is a plan view of my improved press, and Fig. 2 is a front elevation of the same.

Similar letters of reference indicate corresponding parts.

I propose to multiply indefinitely the upright portion of the press, as shown in the accompanying drawings, where there is shown three upright parts, all connected by suitable pipes and valves to one horizontal part of a press, from which the power is supplied to operate as many upright parts as are found practical.

The object of my invention is to get more and better work out of one set of horizontal cylinders and boilers of a direct-acting steam and hydraulic press when used for compressing cotton-bales, and for using greater economy in fuel and general expenses in proportion to the work done.

I have found, in using these presses for compressing cotton-bales, that a great deal of time is occupied in tying the bales after the compressing is done, and, besides, the tyers are expected to tie it so quick that, in their hurry, they do it very loosely, and thereby lose a great deal of the advantage gained by the machine; and while the tying is going on the whole press is to stand still, and as the steam is used twice over—first in one cylinder, then in the other—this standing still so long allows the cylinders to cool, and the steam to condense and lose much of its elastic force for the second use.

To explain more fully, the presses as now constructed, with one upright part, with fair activity in working and tying, will compress one bale per minute upon the average. The machine does its part of the work in fifteen seconds. It requires about fifteen seconds to take out and put in a new bale, which leaves thirty seconds to tie it up. Now, as there are six or seven, and sometimes eight, bands to tie, with all kinds of buckles to fasten them with, it follows that the tying must be done very quickly and very imperfectly.

Now, in the new plan that I propose—say with three upright parts to one horizontal part—the result would be about as follows: say fifteen seconds for the horizontal cylinders to do their work, say fifteen seconds to take out and put in a new bale, and sixty seconds to tie it up. This gives double the time to tie the bales, and the outcome of the work would be doubled, while the consumption of fuel and many other expenses would not be much increased.

To explain the operation, I have marked the upright parts $A^1$ $A^2$ $A^3$, and we must suppose that parts $A^2$ and $A^3$ are up and held up by suitable check-valves $e$, and with bales in their lower parts B C compressed and being tied up, and that part $A^1$ is down to get in a new bale; then the pressure is applied to that, and they are all three up, with bales in them compressed and being tied up; and as soon as any one of them is finished, then, by raising the check-valve $e$, it will be lowered down and a new bale can be put in, and so on.

I will state that I do not propose to make any change in the construction of the machinery as now made and used, but merely to add as many upright parts as one set of horizontal cylinders will supply, said parts to be connected with pipes D and C, and each upright part to have a suitable valve, $e$, that will maintain the pressure while the power is being applied to the others, and by raising the same valve the press will be lowered.

Having thus fully described my invention, I claim as new and desire to secure by Letters Patent—

Two or more presses, A, $A^1$, and $A^2$, whose cylinders $b$ are connected together by pipe C, and with a single supply-pipe, D, by pipes $d$, having the valves $e$, as and for the purpose specified.

JOHN F. TAYLOR.

Witnesses:
JAMES T. GRAHAM,
C. SEDGWICK.